March 25, 1958     J. S. MARTIN     2,827,671
SYNTHETIC RESIN MOUNTING JOINT
Filed Sept. 10, 1954
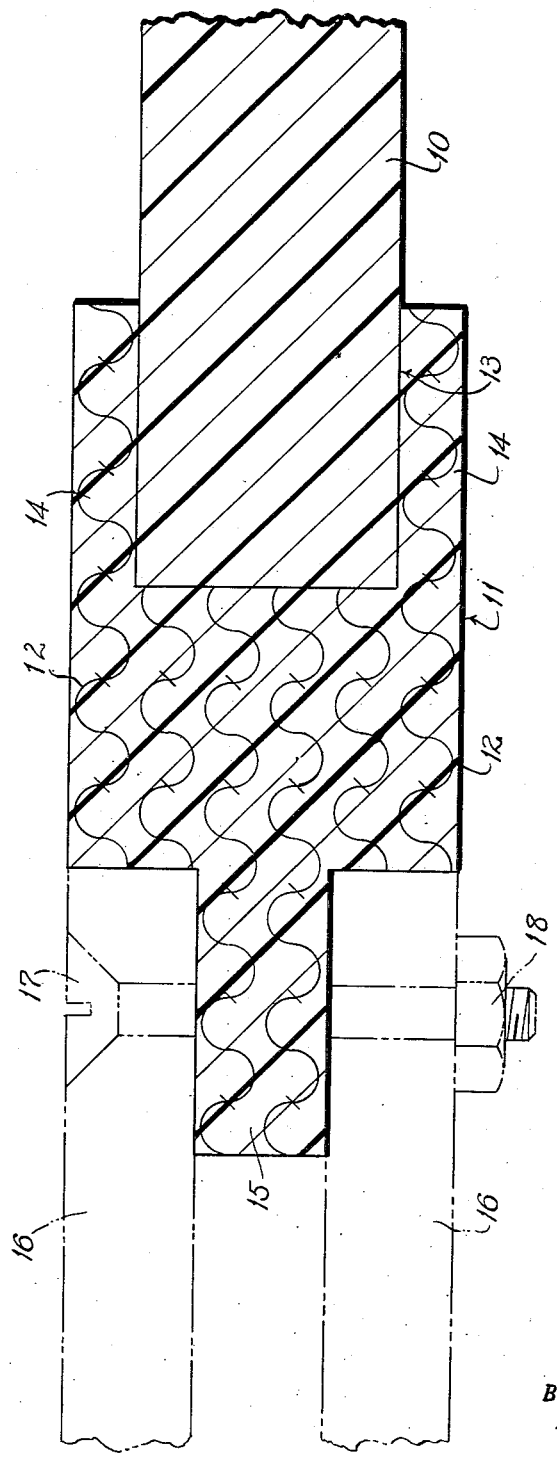
INVENTOR.
James S. Martin
BY Charles S. Wilson
ATTORNEY.

United States Patent Office 2,827,671
Patented Mar. 25, 1958

2,827,671

SYNTHETIC RESIN MOUNTING JOINT

James S. Martin, Huntington, N. Y., assignor to Republic Aviation Corporation, Farmingdale, N. Y., a corporation of Delaware Application September 10, 1954, Serial No. 455,291

1 Claim. (Cl. 20—40)

This invention relates to the mounting of units of synthetic resins such as sheets, panels and structural components, and proposes a reinforced mounting member secured to and projecting from the edge or margin of the unit in such a manner that for all practical purposes it becomes an integral part thereof.

Among its other objects the present invention contemplates a synthetic resin construction and mounting means that is relatively unaffected by exposure to temperature and weather.

The character of the reinforced mounting member of the instant invention is such that, for all practical purposes, it becomes an integral and homogeneous part of the synthetic resin unit where it is joined thereto with the result that it not only reinforces the unit along the joint but, in addition thereto, the joint is relatively unaffected by temperature.

With the above and other objects in view as will be apparent, this invention consists in the construction, combination and arrangement of parts all as hereinafter more fully described, claimed and illustrated in the accompanying drawing. The drawing is a sectional view through one edge of a panel or structural component of synthetic resin and its mounting member made in accordance with the teachings of the present invention and fixedly secured to a portion of an aircraft structure.

Panels, sheets or structural components of synthetic resin have come into wide use in the manufacture of aircraft where they are used extensively for closures such as windshields, canopies, windows and panels or external, structural parts such as can be incorporated in the wings or fuselage of the aircraft. The mounting of such aircraft closures presents many problems in that they must be mounted in such a manner as to be able to withstand unbalanced forces developed by the pressurization of the aircraft and the vibration inherent in the operation thereof, as well as being subjected to wide variations in temperature, without fracturing, crazing or other damage.

To overcome the foregoing problems, it has been the practice, heretofore, to provide such closures with a reinforced mounting member that is joined to the edge of the closure and which projects, in part, outwardly therefrom to be engaged by suitable means for securing the closure to the aircraft. Thus, the reinforced mounting member receives and absorbs the concentrated and unbalanced forces developed by the mounting of the closure to the aircraft. In the past, these reinforced mounting members have been made by laminating a woven fabric such as woven wire, fiberglass or muslin with the same synthetic resin as that from which the closure is made and uniting or joining the mounting member to the edge of the closure in such a manner that the joint therebetween becomes a homogeneous mass of the same synthetic resin reinforced by the woven wire, fiberglass or muslin.

It has been found, however, that reinforced mounting members heretofore devised are unsatisfactory. This is believed to be attributable to the fact that the reinforcing material i. e., woven wire, fiberglass or muslin, is dissimilar or different from the material i. e., synthetic resin, that is used to laminate it in the fabrication of the mounting member. Thus, it would appear that since the synthetic resin used to laminate the reinforcing material of the mounting member has a different coefficient of expansion than that of the reinforcing material, when the joint is subjected to varying temperatures the difference in the expansions and contractions of the synthetic resin and that of the reinforcing material cause the bond therebetween to weaken or fail which, in turn, results in a weakening or failure of the joint.

The present invention proposes a reinforced mounting member integrally or homogeneously united with and projecting from the edge of a synthetic resin panel, sheet or structural component wherein the reinforcing material of the mounting member is made from primarily the same synthetic resin as that of the mounting member and the associated panel, sheet or structural component. Thus, by providing a construction wherein the panel, mounting member and the reinforcing material of the latter are primarily of the same synthetic resin, a substantially homogeneous joint is achieved that is relatively unaffected by exposure to variations in temperature. Moreover, the instant mounting member is so constructed and fabricated that it reinforces the adjoining edge portion of the panel, sheet or structural component and may be engaged by fastening means such as clamps, bolts and the like to mount the panel, sheet or structural component without adversely affecting either the mounting member or the associated panel, sheet or structural component.

Reference being had more particularly to the drawing 10 designates a panel or closure of synthetic resin.

A mounting member 11 is fabricated by superimposing one upon the other a series of layers of material or fabric 12 made by weaving or otherwise fabricating filaments, threads or strands of a synthetic resin primarily the same as that employed in panel 10 and laminating these layers of reinforcing fabric 12 with a synthetic resin that is the same as that used in panel 10. Thus, by utilizing a reinforcing fabric 12 of primarily the same synthetic resin as that used in laminating it, the resulting mounting member 11 is a substantially homogeneous construction, although the reinforcing fabric 12 retains all of its reinforcing characteristics. Further, since the coefficients of expansion of the reinforcing fabric 12 and the mounting member 11, as well as that of the panel 10, are substantially equal, if not the same, there is little or no difference in their expansion or contraction when subjected to varying temperatures.

A pocket or socket 13 is formed or produced in one edge of the mounting member 11 to receive the edge portion of the panel 10. The socket 13 may be formed in any suitable manner. For example, during the fabrication of the mounting member 11 the opposed sides thereof may be provided with extensions 14 to thereby form the socket 13 or, after the mounting member 11 has been cured or set, one of its edges may be suitably routed out to form the socket 13 and the extensions or side-walls 14. In either event, the extensions 14 are so spaced relative to each other as to define a socket 13 for the reception of the edge portion of the panel 10 and to lie against the adjacent opposed sides of the edge portion of the panel 10 positioned therebetween.

Many techniques may be followed in securing the edge of the panel or closure 10 into the socket 13 so as to produce a homogeneous body of the same synthetic resin at the joint therebetween. For example, the lamination of the layers of reinforcing fabric 12 and their impregnation with the synthetic resin in solution, produces a unitary mounting member 11 which may be allowed to cure or set. Thereafter, the walls of the socket 13 and the edge portion of the panel 10 that is to be received therein may be treated with a solvent to soften the synthetic resin. The edge portion of panel 10 may then be inserted into the socket 13 causing the abutting surfaces of the panel 10 and the walls of the socket 13, including the inner sides of the extensions 14, to blend or intimately adhere so that for all practical purposes, the associated portions of the panel 10 and the mounting member 11 become a homogeneous body of synthetic resin. Alternately, the edge portion of the panel 10 may be treated with a solvent to soften the synthetic resin and then inserted into the socket 13 before the mounting member 11 has completely set or cured. In either event, the results are the same in that the synthetic resin of the panel 10 and the mounting member 11 become united into a homogeneous body or mass.

The edge of the mounting member 11 opposite to that in which the socket 13 is formed, is provided with a centrally disposed tongue 15. As in the instance of the socket 13, many techniques may be used in forming the tongue 15. Thus, during the fabrication of the mounting member 11, the tongue 15 may be formed by extending the central portion of this edge, or after the mounting member has been cured and set, portions of the sides thereof may be removed to create or produce the tongue 15. The tongue 15 serves as a means for securing or attaching the mounting member 11, and hence the panel 10, to a supporting or cooperating structure.

The means per se whereby the tongue 15 is secured to a supporting or cooperating structure forms no part of the present invention and any conventional fastening or securing means may be used to this purpose. As shown in the drawing, however, by way of example, the tongue 15 may be positioned between a pair of structural members or plates 16 and conventional fastening means such as one or more bolts 17 may be passed through registered openings in the tongue 15 and plates 16 to the end that upon the tightening of the coacting nut 18 of the bolt 17, the sides of tongue 15 will be secured to the plates 16. To provide for the relative expansion or contraction of the plates 16, the bolts 17 and the tongue 15 when they are subjected to varying temperatures, the openings through which the bolts 17 pass may be slotted or other conventional means for accommodating the above differential expansion or contraction of the joined parts may be provided.

The present invention can be applied to any type of synthetic resin suitable for the purposes and construction of the closure, panel or structural component 10 the mounting member 11 and its reinforcing material or fabric 12. However, it is primarily intended to employ a thermoplastic synthetic resin such as acrylic or methyl methacrylate resin commonly known by and procurable on the open market under the trade names "Lucite" or "Plexiglas" in the fabrication of the closure 10 and in the mounting member 11. In instances where the closure or panel 10 and the mounting member 11 are fabricated from acrylic or methyl methacrylate resin, then it is primarily intended to employ as the reinforcing fabric 12 of the mounting member 11, a fabric or material made by weaving or otherwise fabricating filaments, threads or strands of synthetic acrylic resin. Such synthetic acrylic fabrics or materials are commonly known by and procurable on the open market under the trade names "Orlon," "Acrilan," "X-51" or "Dynel." It is to be understood, however, that other synthetic resins may be suitable for the purposes of the present invention.

From the foregoing, it is evident that the present invention in its broader aspects resides in a reinforced mounting member of synthetic resin that is united or joined to a closure or panel of the same synthetic resin in such a manner that the joint therebetween consists of a homogeneous mass of the same synthetic resin and wherein the reinforcing material of the mounting member is primarily of the same synthetic resin as that of the mounting member and the associated closure or panel.

What is claimed is:

The combination with a closure composed of acrylic resin, of a mounting member consisting of layers of reinforcing material fabricated from filaments made of the same resin as that in the closure and laminated by impregnation with a solution of the same resin as that in the reinforcing material and the closure, and secured to the edge portion of the closure so as to produce a homogeneous body of the same resin throughout the joint thus formed.

References Cited in the file of this patent

UNITED STATES PATENTS

| 2,511,168 | Martin et al. | June 13, 1950 |
| 2,572,947 | Pevney | Oct. 30, 1951 |
| 2,576,734 | Voelker | Nov. 27, 1951 |